May 14, 1935.  J. V. JAMES  2,001,575
METHOD OF COATING CORD MATERIAL
Filed March 23, 1934
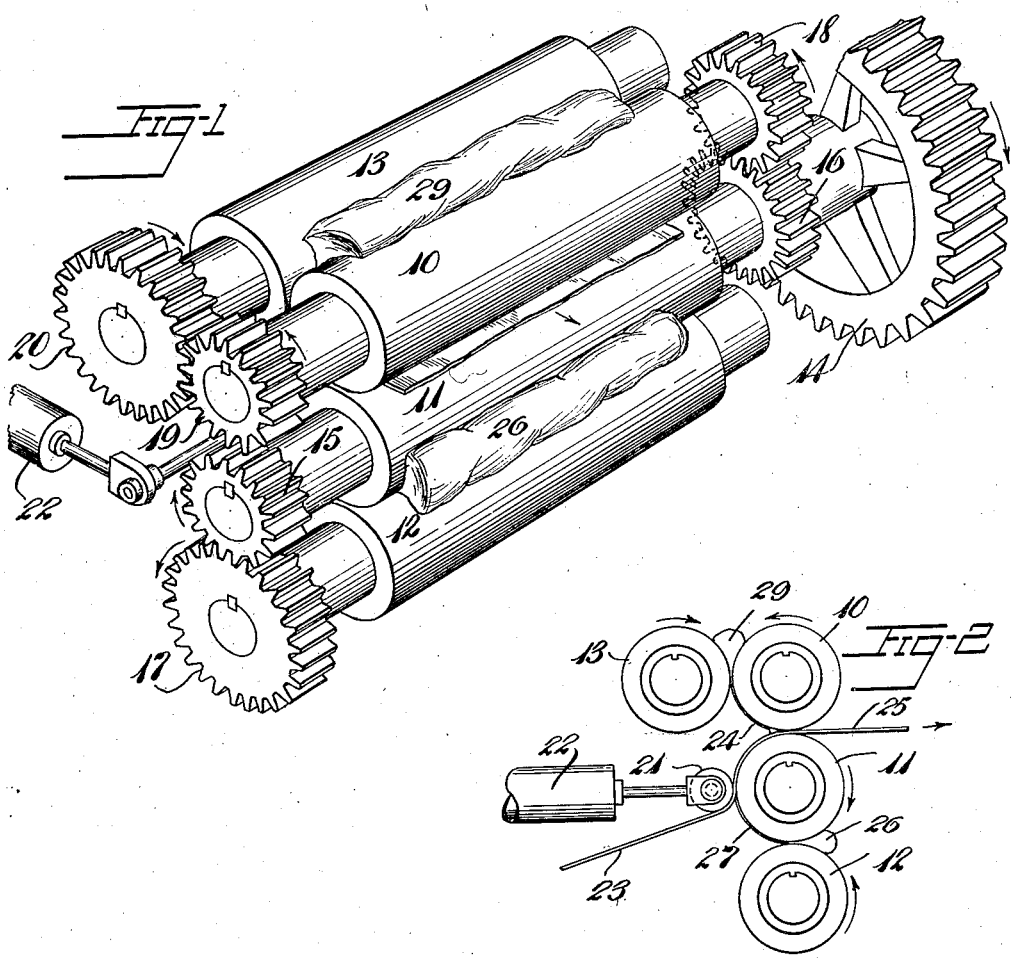
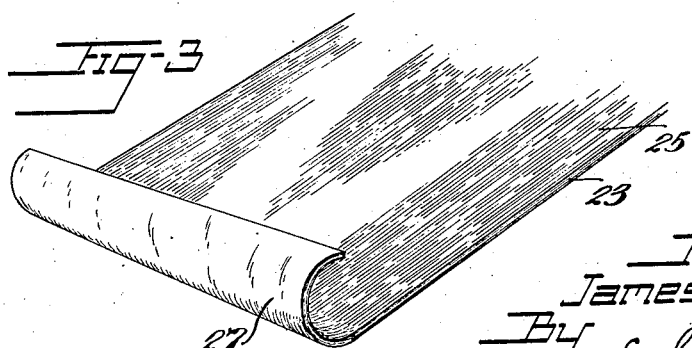
Inventor
James V. James
By Eakin & Avery
Attys.

Patented May 14, 1935

2,001,575

UNITED STATES PATENT OFFICE 2,001,575

METHOD OF COATING CORD MATERIAL

James V. James, Akron, Ohio, assignor to The B. F. Goodrich Company, New York, N. Y., a corporation of New York Application March 23, 1934, Serial No. 717,006

3 Claims. (Cl. 154—2)

This invention relates to methods of coating cord material with a vulcanizable plastic such as rubber.

In the manufacture of pneumatic tires and other articles built of laminated piles of fibrous material such as woven fabrics or unwoven cords, it has been customary to pass the web of fibrous material between heated rollers where the plastic material is forced between the interstices of the web or is merely applied to its surface. When the plastic is forced between the interstices of the fabric or cords, by passing the web through the nip between heated rolls running at different surface speeds, so that the plastic, supplied by one of the rolls, is smeared into the interstices, and very little thereof remains upon the face of the web, the operation is commonly known as "frictioning". Complete filling of the interstices requires two frictioning operations, the plastic being first smeared into one face of the fabric and then smeared into the other face in a second operation.

When a layer of plastic is required on the surface of the web, the operation is accomplished by passing the web through the nip of heated rolls running at even surface speeds and a ply of plastic, formed on the face of one of the rolls by cooperation of a third roll therewith, is laid on the web and pressed thereagainst without smearing action. This operation is known in the art as "coating".

In the manufacture of pneumatic tire casings it is necessary, not only to fill the interstices between the cords in each ply with a resilient rubber composition, but also to provide a cushioning layer between the plies. In the manufacture of tires from square-woven fabric this was accomplished by three calendering operations, the fabric being frictioned on one face, then frictioned on the opposite face, then coated on one face. In the use of so-called cord-fabric, wherein a layer of spaced parallel cords are temporarily held in position by weak and sparsely spaced filler threads, so that the material before being rubberized may be handled like woven fabric, a similar process of applying the rubber has been used, but due to the loose nature of the weave, and the pressure and differential speed of the rolls, the resulting sheet or web has been imperfect, the waste of material has been great, and the cost of the operation has been high.

In the manufacture of tires from weftless cords, a multiplicity of similar cords are passed through a comb and into the nip between calender rolls, where plastic rubber composition is applied. As there are no filling threads to hold the cords in proper spaced relation, it is impossible to friction the cord until a coating of rubber composition has been applied to one face thereof.

In order to avoid the difficulties of first frictioning either cord fabric or weftless cords, it is customary to first apply a coat of rubber to one face of the web by even speed rolls, and then to attempt to fill the interstices between the cords from the other side by a coating applied in the same manner, or to apply coats from opposite sides simultaneously, always using rolls running at even speeds. Such methods have resulted in the entrapment of air in the interstices between the two coats, the result being that when the resulting material is incorporated in a tire an insufficient layer of rubber remains between the plies, the coatings being forced into the interstices, or, when insufficient molding pressure is used, the entrapped air results in separation of the plies in the tire.

The principal objects of the present invention are to provide a method of completely filling the interstices and providing a surface coating in a single operation, to produce an improved product, and to provide economy of operation.

Other objects will appear from the following description and the accompanying drawing.

In the drawing:

Fig. 1 is a perspective view of the roll mechanism of a four roll calender such as is shown in practicing the invention, the frame of the machine not being shown and parts being broken away to show the mechanism.

Fig. 2 is a diagrammatic sectional view showing the arrangement of the rolls.

Fig. 3 is a perspective view of the finished ply of material.

Referring to the drawing, in practicing the invention, I employ a calender comprising three superimposed smooth-faced rolls 10, 11, and 12 and a fourth roll 13 at one side of the roll 10. Roll 11 has fixed thereto a driving gear 14 whereby the roll is rotated. It is also provided with pinions 15 and 16 fixed thereto for transmitting motion to the other rolls. Pinion 15 meshes with a pinion 17 carried by roll 12. Pinion 16 meshes with pinion 18 on roll 10. Roll 10 also has a pinion 19 which meshes with a pinion 20 on roll 13.

It will be understood that means, not shown, are provided, as usual, to adjust roll 12 toward and from roll 11, roll 10 toward and from roll 11, and roll 13 toward and from roll 10, and that means are also provided for heating and cooling the rolls.

A pressing roller 21 is mounted adjacent roll 11 and pressure means, such as a pair of fluid pressure cylinders, one of which 22, is shown, is provided for pressing it toward the face of roll 11.

Pinions 16 and 18 are of such diameters that the surface of roll 10 travels faster than that of roll 11, the arrangement being such that when a web of fabric or cord 23 is fed under pressure roll 21 and around roll 11 between the nip of rolls 10 and 11 it will travel at the speed of roll 11 but a film of rubber composition 24, formed between rolls 10 and 13 and approaching the nip of rolls 10 and 11 upon the face of roll 10 will travel at a faster speed. The rubber 24 will therefore be wiped into the interstices of the web by a continuous upsetting of the film and the excess rubber will be smoothed by 24 and the excess rubber will be smoothed by roll 10 in the direction of travel of the web to provide a smooth coating 25. While different surface speed ratios may be employed, I prefer to cause roll 10 to travel substantially 25% faster than roll 11 as I find that with this ratio I am able not only to fill the interstices of the web, but also to provide a smooth surfaced coat of the required thickness.

Rolls 10 and 13 are also driven at different speeds in the preferred form of the device, although they may operate at the same speed. They operate to reduce the bank of plastic composition 29 to form a sheet 24 on roll 10. The best speed ratio depends somewhat upon the plastic material used, but when the rolls are run at differential speeds, blisters in the material are avoided. In the preferred form of device roll 13 is rotated at about two thirds of the speed of roll 10.

Rolls 11 and 12 similarly are geared to operate at different surface speeds and are employed to reduce a bank 26 of plastic composition to provide a sheet 27 thereof which follows roll 11 and is united with the web 23 by the pressure roll 21. Roll 12 preferably is driven at a surface speed equal to two thirds of the speed of roll 11.

When weftless cord is to be coated, suitable guiding means is provided to present the cords in properly spaced relation to roll 21. As such mechanism forms no part of the invention it is not shown in the drawing.

In practicing the invention, the rubber composition forming the bank 26 is sheeted by rolls 11, 12 and the sheet 27 follows roll 11. The web 23 of weftless cord or of fabric is introduced between pressing roll 21 and roll 11 where it is pressed against one side of the web without appreciably filling the interstices thereof. When weftless cord is used, the coat 27 serves to retain the cords in proper spaced relation. The web, coated on one side, then proceeds around the roll 11 in contact therewith until it enters the nip between rolls 10 and 11. At this point the plastic sheet 24 meets the web at a velocity greater than that at which the web is traveling. The plastic forms an almost imperceptible bank at the nip of rolls 10 and 11 and is driven into the interstices of the web. The excess of plastic, over that necessary to fill the interstices is regulated by the adjustment of roll 13 to roll 10 so that there is just sufficient plastic to form the desired coat upon the web. As the roll 10 revolves faster than the roll 11 this coat is smoothed by roll 10 in the direction of travel of the web. It will be apparent from the foregoing description that the interstices of the web are completely filled and a coating of plastic is applied to both sides of the web at a single pass of the cords or fabric through the calender, all operations being performed while the cords are held against shifting by constant support of a single roll.

I claim:

1. The method of coating and filling the interstices of a sheet comprising textile cords which comprises applying a layer of plastic material to one face of the sheet while the sheet is supported by a roll to hold the cords in the desired relation, and without removing the sheet from its support, wiping plastic into its interstices from the opposite face of the sheet and simultaneously forming a coating over the face of the sheet.

2. The method of frictioning and coating a sheet of material comprising cords which comprises supporting and advancing the sheet of material upon the face of a roll, skim coating one side of the sheet while the sheet is supported by the roll, and while the sheet is so supported simultaneously frictioning and coating the exposed face of the sheet with plastic material by feeding plastic material to a zone across the face of the roll at a rate in excess of that necessary to fill the interstices of the sheet as it passes said zone, and smoothing the excess over the face of the sheet in the direction of travel of the sheet at a velocity greater than that at which the sheet is traveling.

3. The method of frictioning and coating weftless cord which comprises forming and advancing a sheet of plastic material upon the face of a roll, feeding a multiplicity of cords into contact with the sheet in parallel relation, advancing the compound sheet of plastic and cords past a zone across the face of the roll and simultaneously filling the interstices between the cords and forming a coat of plastic over the cords by feeding plastic material to said zone at a rate in excess of that necessary to fill the interstices between the cords as the cords pass through said zone, and smoothing the excess plastic over the face of the compound sheet in the direction of travel of the sheet at a velocity greater than that at which the sheet is traveling.

JAMES V. JAMES.